US012561105B2

(12) United States Patent
Zhang et al.

(10) Patent No.: US 12,561,105 B2
(45) Date of Patent: Feb. 24, 2026

(54) ONLINE ELECTRONIC WHITEBOARD CONTENT SYNCHRONIZATION AND SHARING SYSTEM

(71) Applicant: Guangdong Baolun Electronics Co., Ltd., Guangdong (CN)

(72) Inventors: Baogui Zhang, Guangdong (CN); Changhua Zhang, Guangdong (CN); Zhenghui Zhu, Guangdong (CN); Dingjin Zhao, Guangdong (CN)

(73) Assignee: Guangdong Baolun Electronics Co., Ltd., Guangzhou (CN)

( * ) Notice: Subject to any disclaimer, the term of this patent is extended or adjusted under 35 U.S.C. 154(b) by 135 days.

(21) Appl. No.: 18/421,604

(22) Filed: Jan. 24, 2024

(65) Prior Publication Data

US 2024/0168697 A1    May 23, 2024

Related U.S. Application Data

(63) Continuation of application No. PCT/CN2021/133607, filed on Nov. 26, 2021.

(30) Foreign Application Priority Data

Aug. 30, 2021    (CN) .......................... 202111002149.X

(51) Int. Cl.
G06F 3/14       (2006.01)
G06F 3/147      (2006.01)
G06T 11/20      (2006.01)
(52) U.S. Cl.
CPC .......... G06F 3/1454 (2013.01); G06T 11/203 (2013.01)
(58) Field of Classification Search
None
See application file for complete search history.

(56) References Cited

U.S. PATENT DOCUMENTS

2007/0219981 A1* 9/2007 Takaai ................... G06Q 10/10
                                                              707/999.005
2011/0175929 A1* 7/2011 Tanaka ................. G06Q 10/101
                                                              345/629

(Continued)

FOREIGN PATENT DOCUMENTS

CN          107040749 A     8/2017
CN          207910808 U     9/2018

(Continued)

OTHER PUBLICATIONS

GeeksforGeeks, "WebSocket and Its Difference from HTTP", 2025, retrieved from "https://www.geeksforgeeks.org/web-tech/what-is-web-socket-and-how-it-is-different-from-the-http/" (Year: 2025).*

(Continued)

*Primary Examiner* — Michael J Cobb

(74) *Attorney, Agent, or Firm* — MUNCY, GEISSLER, OLDS & LOWE, P.C.

(57) ABSTRACT

An online electronic whiteboard content synchronization and sharing system includes an electronic whiteboard server and a plurality of clients, wherein an electronic whiteboard is installed in each client. The electronic whiteboard comprises a first layer, a second layer, a third layer and a fourth layer, which are sequentially stacked together, wherein the first layer is used to set a background color; the second layer is used to set a background picture; the third layer is used to draw received drawing data, which is transmitted from a network side; and the fourth layer is used to draw graphics on a local side. By means of the system, drawing data sent from network sides at the same time does not interfere with drawing data on a local side, such that a high real-time performance is achieved.

10 Claims, 1 Drawing Sheet

(56)     References Cited

U.S. PATENT DOCUMENTS

| | | | |
|---|---|---|---|
| 2017/0249764 A1* | 8/2017 | Fujii ..................... | H04M 1/724 |
| 2018/0095711 A1* | 4/2018 | Kanda ................... | G06F 3/1454 |
| 2020/0126513 A1* | 4/2020 | Lau .......................... | G09G 5/14 |
| 2021/0351946 A1* | 11/2021 | Chanda .............. | H04L 12/1818 |

FOREIGN PATENT DOCUMENTS

| | | |
|---|---|---|
| CN | 110737372 A | 1/2020 |
| CN | 113434106 A | 9/2021 |
| JP | 2001228843 A | 8/2001 |

OTHER PUBLICATIONS

Codecademy, "What is HTTP? Understanding HTTP Requests", 2025, retrieved from "https://www.codecademy.com/article/what-is-http" (Year: 2025).*

* cited by examiner

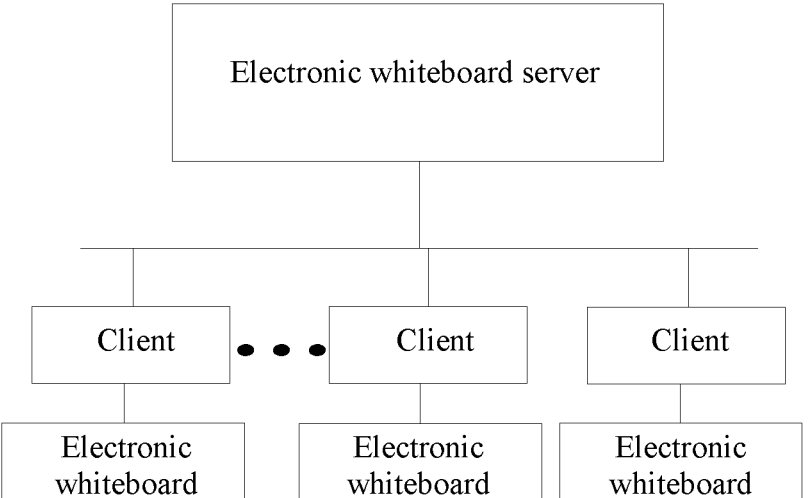

ONLINE ELECTRONIC WHITEBOARD CONTENT SYNCHRONIZATION AND SHARING SYSTEM

CROSS REFERENCE TO RELATED APPLICATIONS

This application is a Continuation of the U.S. National Stage of International Application No. PCT/CN2021/133607 filed on Nov. 26, 2021, which claims priority to Chinese Patent Application No. 202111002149.X on filed Aug. 30, 2021 under 35 U.S.C. § 119; the entire contents of all of which are hereby incorporated by reference.

TECHNICAL FIELD

The present application relates to the technical field of online electronic whiteboard content synchronization display and sharing, and particularly relates to an online electronic whiteboard content synchronization and sharing system.

BACKGROUND

An electronic whiteboard is often used as a carrier for content output display in application scenarios of online training, education, conferences, etc. Respective graphics can be drawn and words can be written on the electronic whiteboard to achieve a purpose of synchronization and sharing. Taking a video conference as an example, each conferee often needs to show and share to other conferees by drawing graphics (word writing is also one of graphic drawing). Thus, the conferees needing to share shall draw graphics on an own electronic whiteboard on a participating terminal, then upload the drawn graphics to a server, and forward the graphics to other conferees through the server, so as to achieve real-time synchronization and sharing. Meanwhile, when a conferee also needs to receive the graphics drawn by others, the graphics are displayed on an own electronic whiteboard on the participating terminal.

An existing electronic whiteboard content synchronization and sharing technology has some shortcomings or defects, including the shortcomings or defects of mutual interference caused by an electronic whiteboard and a video conference, low real-time performance, mutual interference between drawing data on a local side and drawing data transmitted from a network side, etc. by taking an electronic whiteboard applied for a video conference as an example. Due to existence of these shortcomings or defects, a better synchronization and sharing system is needed.

SUMMARY

In view of the defects in the prior art, the purpose of the present application is to provide an online electronic whiteboard content synchronization and sharing system, which can solve the problems mentioned in the background.

A technical solution for achieving the purpose of the present application is: an online electronic whiteboard content synchronization and sharing system comprises an electronic whiteboard server and a plurality of clients, wherein an electronic whiteboard is installed in each client. The electronic whiteboard comprises a first layer, a second layer, a third layer and a fourth layer, which are sequentially stacked together;

The first layer is used to set a background color of the electronic whiteboard, and the first layer is a non-transparent layer.

The second layer is used to set a background picture of the electronic whiteboard, and the second layer is a non-transparent layer when the background picture is set and is a transparent layer when the background picture is not set.

The third layer is used to draw received drawing data, which is transmitted from a network side; the drawing data comprises first drawing data and second drawing data; the third layer comprises a P interface and a D interface; the first drawing data is received from the P interface and the second drawing data is received from the D interface; and the first drawing data is different from the second drawing data.

The fourth layer is used to draw graphics on a local side, and after the graphics are drawn, clear the graphics drawn on the local side on the fourth layer, and then send the graphics drawn on the local side, as drawing data on the local side, to the third layer on the same page for drawing.

The fourth layer is also used to send drawing data formed by the graphics drawn on the local side to the electronic whiteboard server.

The electronic whiteboard server is used to forward the drawing data completed locally by a current client to other clients, so as to complete content synchronization and sharing.

Further, the first drawing data is batch drawing data, and the second drawing data is unit drawing data; the batch drawing data means that one layer comprises more than two unit drawing data; and the unit drawing data means that one layer contains only one basic graphic.

Further, a video conference terminal establishes websocket communication connection with the electronic whiteboard server; the first drawing data is all drawing data received from the electronic whiteboard server on a page on the electronic whiteboard, or from turning pages, or entire page drawing data by adjusting from a page on the electronic whiteboard to a next page; the first drawing data is the drawing data obtained by the P interface through a http request, and the second drawing data is a single drawing datum received by the D interface from the electronic whiteboard server through websocket.

Further, the first drawing data and the second drawing data are both dot matrix operation data.

Further, if the current client sends a drawing withdrawal instruction to the electronic whiteboard server, after the drawing withdrawal instruction is received by the electronic whiteboard server, the electronic whiteboard server deletes a last drawing datum of the current client on the electronic whiteboard from a database, and sends the drawing withdrawal instruction to other clients. After receiving the drawing withdrawal instruction, other clients execute solution 1 or solution 2:

Solution 1: clearing the drawing data of the third layer of the current electronic whiteboard in the client, re-requesting the drawing data of a page where the current electronic whiteboard is located to the electronic whiteboard server, and redrawing the drawing data of the page on the third layer;

Solution 2: deleting the last drawing datum from the locally saved drawing data of the client, clearing the drawing data on the third layer, and then redrawing on the third layer according to the saved drawing data.

Further, if the current client sends a page addition instruction to the electronic whiteboard server, after the electronic whiteboard server receives the page addition instruction, the electronic whiteboard server feeds back a response signal to the current client and simultaneously sends the page addition instruction to other clients.

After the current client receives the response signal, the current client clears the drawing data on the third layer of the electronic whiteboard of a current page, and updates a page number of the current page by +1.

Further, if the current client sends a page turning instruction to the electronic whiteboard server, the drawing data on the third layer where the current page is located is cleared, and the drawing data of the electronic whiteboard of a next page is received from the electronic whiteboard server and then drawn to the third layer where the current page is located, so as to achieve page turning.

Further, if the current client sends a page deletion instruction to the electronic whiteboard server, after the electronic whiteboard server receives the page deletion instruction, the drawing data on a specified page is deleted and a deletion instruction of the specified page is forwarded to other clients.

After the current client receives the response signal fed back from the electronic whiteboard server, a total number of pages of the electronic whiteboard is updated by −1, the drawing data on the third layer on the specified page is cleared, and the drawing data of the current page received from the electronic whiteboard server is drawn on the third layer of the specified page.

Further, the online electronic whiteboard content synchronization and sharing system is applied to a video conference system. A video conference client added to the video conference system firstly sends a request to the electronic whiteboard server to obtain electronic whiteboard information shown by a current video conference. The electronic whiteboard information comprises the total number of pages of the electronic whiteboard, a background color and a background picture of each page of the electronic whiteboard, and the drawing data of an electronic whiteboard page shown currently. Then, the video conference terminal redraws and displays the drawing data of the electronic whiteboard page shown currently on the third layer of the electronic whiteboard of the video conference terminal according to the obtained electronic whiteboard information.

The present application has the following beneficial effects: the present application can well make the operation of the electronic whiteboard and the business of sharing (such as video conferences) not interfere with each other, and has high real-time performance, comprising multiple operation functions such as withdrawing, page turning and deletion, and strong operability; and the drawing data transmitted from the network side at a same time does not interfere with the drawing data on the local side.

DESCRIPTION OF DRAWINGS

The FIGURE is a principle frame schematic diagram of the present application.

DETAILED DESCRIPTION

To make the purpose, the technical solutions and the advantages of the present application more clear, specific embodiments of the present application are further described below in detail in combination with drawings. It should be understood that the specific embodiments described herein are only used for explaining the present application, not used for limiting the present application. In addition, it should be noted that for ease of description, the drawings only show some portions related to the present application rather than all portions. Before exemplary embodiments are discussed in more detail, it should be mentioned that some exemplary embodiments are described as processing or methods depicted as flow charts. Although the flow charts describe various operations (or steps) as sequential processing, many operations can be implemented in parallel, concurrently, or simultaneously. In addition, a sequence of various operations can be rearranged. The processing can be terminated when the operation is completed, but additional steps not included in the drawings can also be possessed. The processing may correspond to methods, functions, procedures, subroutines, subprograms, etc.

By referring to the Figure, an online electronic whiteboard content synchronization and sharing system comprises an electronic whiteboard server and a plurality of clients. An electronic whiteboard is installed in each client. In the present embodiment, a video conference terminal is used as the client for description. The electronic whiteboard comprises a first layer, a second layer, a third layer and a fourth layer, which are sequentially stacked together. In practical use, the first layer, the second layer, the third layer and the fourth layer are in sequence from bottom to top, which, of course, can be reversed, i.e., the first layer, the second layer, the third layer and the fourth layer are in sequence from top to bottom. The first layer is used to set a background color of the electronic whiteboard. The background color is white by default, i.e., the first layer is set to white, and of course, can also be set to other non-transparent colors. Therefore, the first layer is a non-transparent layer to facilitate the display of the background color on the electronic whiteboard. The second layer is used to set a background picture of the electronic whiteboard, and the second layer is a non-transparent layer when the background picture is set and is a transparent layer when the background picture is not set. The third layer is used to receive drawing data transmitted from a network side and draw the drawing data on the third layer. The third layer comprises two interfaces (a P interface and a D interface) used to receive first drawing data from the P interface and draw the first drawing data on the third layer and used to receive second drawing data from the D interface and draw the second drawing data on the third layer. The first drawing data is different from the second drawing data. The fourth layer is used to draw graphics on a local side, and after the graphics are drawn, the graphics drawn on the local side on the fourth layer are cleared, and the graphics drawn on the local side, as drawing data on the local side, are sent to the third layer on the same page for drawing. Synchronously, the fourth layer sends drawing data formed by the graphics drawn to the electronic whiteboard server after the graphics are drawn on the local side, which is convenient for other video conference terminals to obtain the drawing graphics drawn locally by a current video conference terminal through the electronic whiteboard server, i.e., the electronic whiteboard server forwards the drawing data completed locally by a current client to other clients, so that each client can achieve content synchronization and sharing.

In the present embodiment, the first drawing data is batch drawing data, and the second drawing data is unit drawing data; the batch drawing data means that one layer comprises more than two unit drawing data; and the unit drawing data means that one layer contains only one basic graphic, such as a circle or a rectangle or a straight line or a written word, etc. Taking a scenario applied in a video conference as an example, an electronic whiteboard is installed in a video conference terminal, and the video conference terminal establishes websocket communication connection with the electronic whiteboard server. The first drawing data is all drawing data received from the electronic whiteboard server on a page on the electronic whiteboard, or from turning pages, or entire page drawing data by adjusting from a page on the electronic whiteboard to a next page; and the first drawing data is the drawing data obtained by the P interface through a http request. The second drawing data is a single drawing datum received by the D interface from the electronic whiteboard server through websocket, i.e., the unit drawing data.

Wherein the first drawing data and the second drawing data are both dot matrix operation data, i.e., position data of composition points of drawn lines in coordinate intervals of the whiteboard. At this moment, the dot matrix data is used as the operation data for operation of the drawn lines. For example, a curve is drawn on the electronic whiteboard, coordinates that the curve passes through are recorded, the coordinates are saved in an array, and parameters that indicate a line type and a color of the curve are added, so as to constitute the first drawing data or the second drawing data, which can use a json data format.

By drawing the drawing data from different sources on the third layer and the fourth layer, when a current video conference terminal where the electronic whiteboard is located draws local drawing data, mutual interference between the local drawing data and drawing data at a network side due to receiving of the drawing data sent by other video conference terminals before the local drawing data is completed can be avoided, that is, the local drawing data drawn currently may not be interfered. If there is only one layer used for drawing, it is assumed that a red curve is being drawn locally but has not been drawn. At this moment, drawing data a for drawing a green curve is received from the electronic whiteboard server. If the drawing data a is not blocked, local drawing needs to be ended immediately or the red curve drawn locally is changed to the green curve, which may cause unexpected results. If the drawing data a is blocked, only after the local drawing is completed, the drawing data a transmitted from the network side can be drawn, which greatly reduces real-time performance and is almost unacceptable for delay-sensitive application scenarios such as video conferences.

If the current client sends a drawing withdrawal instruction to the electronic whiteboard server, after the instruction is received by the electronic whiteboard server, the electronic whiteboard server deletes a last drawing datum of the current client on the electronic whiteboard from a database, and sends the drawing withdrawal instruction to other clients. After receiving the drawing withdrawal instruction, other clients execute solution 1 or solution 2:

Solution 1: clearing the drawing data of the third layer of the current electronic whiteboard in respective clients, re-requesting the drawing data of a page where the current electronic whiteboard is located to the electronic whiteboard server through http, and redrawing the drawing data of the page on the third layer.

Solution 2: deleting the last drawing datum from the locally saved drawing data, clearing the drawing data on the third layer, and then redrawing on the third layer according to the saved drawing data.

Through the solution 1 or the solution 2, after one client withdraws a certain drawing datum, other clients can also display "withdrawing" operation synchronously and display the same drawing graphics to achieve a synchronization effect.

If the current client sends a page addition instruction to the electronic whiteboard server, after the electronic whiteboard server receives the page addition instruction, the electronic whiteboard server feeds back a response signal to the current client and simultaneously sends the page addition instruction to other clients. After the current client receives the response signal, the electronic whiteboard on a current page is cleared, that is, the drawing data on the third layer of the electronic whiteboard of the current page is cleared, and a page number of the current page is updated by +1. For example, if the page number of the current page is 1, then an updated page number is 2.

If operation such as page turning or page deletion is needed, the operation can also be realized by updating page number information. A specific process is similar to page addition. For example, if page turning is needed, a page needs to be jumped from a first page to a second page. After the current client sends a page turning instruction, the drawing data on the third layer where the current page is located is cleared, and the drawing data of the electronic whiteboard of the second page (i.e., a next page) is received from the electronic whiteboard server and then drawn to the third layer where the current page is located, so as to achieve a page turning effect. Similarly, if page deletion is needed, the current client sends a page deletion instruction, after the electronic whiteboard server receives the page deletion instruction, the drawing data on a specified page is deleted and a deletion instruction of the specified page is forwarded to other clients. After the current client receives the response signal fed back from the electronic whiteboard server, a total number of pages of the electronic whiteboard is updated by −1, the drawing data on the third layer on the specified page is cleared, and the drawing data of the current page received from the electronic whiteboard server is drawn on the third layer of the specified page.

When the online electronic whiteboard content synchronization and sharing system is applied to a video conference system, a video conference client added to the video conference system firstly sends a request to the electronic whiteboard server when just entering a video conference, to obtain electronic whiteboard information shown by the current video conference. The electronic whiteboard information comprises the total number of pages of the electronic whiteboard, a background color and a background picture of each page of the electronic whiteboard, and the drawing data of an electronic whiteboard page shown currently. Then, the video conference terminal redraws and displays the drawing data of the electronic whiteboard page shown currently on the third layer of the electronic whiteboard of the video conference terminal according to the obtained electronic whiteboard information.

The present application can be well applied in video conferences or other sharing systems, provides data storage and processing software in an aspect of content sharing as an information technology service software, and can integrates the software into a video conference device to realize the video conference system under a combination of software and hardware. Content (such as drawing graphic data) sharing is realized in the video conference system.

The present application is described with reference to flow charts and/or block diagrams according to a method, device (system) and computer program product in embodiments of the present application. It should be understood that each flow and/or block in the flow charts and/or block diagrams and a combination of flows and/or blocks in the flow charts and/or block diagrams can be realized through computer program instructions. The computer program instructions can be provided for a processor of a general-purpose computer, a special-purpose computer, an embedded processor, or other programmable data processing devices to generate a machine, so that a device for realizing designated functions in one or more flows of the flow charts and/or one or more blocks of the block diagrams is generated through the instructions executed by the processor of the computer or other programmable data processing devices.

The computer program instructions can also be stored in a computer readable memory which can guide the computer or other programmable data processing devices to operate in a special mode, so that the instructions stored in the computer readable memory generate a manufactured product including an instruction device, the instruction device realizing designated functions in one or more flows of the flow charts and/or one or more blocks of the block diagrams.

The computer program instructions can also be loaded on the computer or other programmable data processing devices, so that a series of operation steps are executed on the computer or other programmable devices to generate processing realized by the computer. Therefore, the instructions executed on the computer or other programmable devices provide steps for realizing designated functions in one or more flows of the flow charts and/or one or more blocks of the block diagrams.

Although preferred embodiments of the present application are described, those skilled in the art can make additional alterations and amendments to the embodiments once knowing basic creative concepts. Therefore, the appended claims are interpreted to include the preferred embodiments and all the alterations and amendments which fall into the scope of the present application.

Obviously, those skilled in the art could implement various modifications and variations of the present application without departing from the spirit and scope of the present application. So, the present application is intended to include the modifications and variations if the amendments and variations of the present application belong to claims of the present application and the equivalent technical scope.

What is claimed is:

1. An online electronic whiteboard content synchronization and sharing system, comprising an electronic whiteboard server and a plurality of clients, wherein an electronic whiteboard is installed in each client; the electronic whiteboard comprises a first layer, a second layer, a third layer and a fourth layer, which are sequentially stacked together;

the first layer is used to set a background color of the electronic whiteboard, and the first layer is a non-transparent layer;

the second layer is used to set a background picture of the electronic whiteboard, and the second layer is a non-transparent layer when the background picture is set and is a transparent layer when the background picture is not set;

the third layer is used to draw received drawing data, which is transmitted from a network side; the drawing data comprises first drawing data and second drawing data; the third layer comprises a first interface and a second interface; the first drawing data is received from the first interface and the second drawing data is received from the second interface; and the first drawing data is different from the second drawing data;

the first drawing data is the drawing data obtained by the first interface through a http (hypertext transfer protocol) request, and the second drawing data is a single drawing datum received by the second interface from the electronic whiteboard server through WebSocket;

the fourth layer is used to draw graphics on a local side, and after the graphics are drawn, clear the graphics drawn on the local side on the fourth layer, and then send the graphics drawn on the local side, as drawing data on the local side, to the third layer on the same page for drawing;

the fourth layer is also used to send drawing data formed by the graphics drawn on the local side to the electronic whiteboard server; and the electronic whiteboard server is used to forward the drawing data completed locally by a current client to other clients of the plurality of clients, so as to complete content synchronization and sharing.

2. The online electronic whiteboard content synchronization and sharing system according to claim 1, wherein the first drawing data is batch drawing data, and the second drawing data is unit drawing data; the batch drawing data means that one layer comprises more than two unit drawing data; and the unit drawing data means that one layer contains only one basic graphic.

3. The online electronic whiteboard content synchronization and sharing system according to claim 2, wherein a video conference terminal establishes WebSocket communication connection with the electronic whiteboard server; the first drawing data is all drawing data received from the electronic whiteboard server on a page on the electronic whiteboard, or from turning pages, or entire page drawing data by adjusting from a page on the electronic whiteboard to a next page.

4. The online electronic whiteboard content synchronization and sharing system according to claim 1, wherein the first drawing data and the second drawing data are both dot matrix operation data.

5. The online electronic whiteboard content synchronization and sharing system according to claim 1, wherein in case that the current client sends a drawing withdrawal instruction to the electronic whiteboard server, after the drawing withdrawal instruction is received by the electronic whiteboard server, the electronic whiteboard server deletes a last drawing datum of the current client on the electronic whiteboard from a database, and sends the drawing withdrawal instruction to the other clients; after receiving the drawing withdrawal instruction, the other clients execute solution 1 or solution 2:

solution 1: clearing the drawing data of the third layer of the current electronic whiteboard in the client, re-requesting the drawing data of a page where the current electronic whiteboard is located to the electronic whiteboard server, and redrawing the drawing data of the page on the third layer;

solution 2: deleting the last drawing datum from locally saved drawing data of the client, clearing the drawing data on the third layer, and then redrawing on the third layer according to the locally saved drawing data.

6. The online electronic whiteboard content synchronization and sharing system according to claim 1, wherein in case that the current client sends a page addition instruction to the electronic whiteboard server, after the electronic whiteboard server receives the page addition instruction, the electronic whiteboard server feeds back a response signal to the current client and simultaneously sends the page addition instruction to the other clients; after the current client receives the response signal, the current client clears the drawing data on the third layer of the electronic whiteboard of a current page, and updates a page number of the current page by +1.

7. The online electronic whiteboard content synchronization and sharing system according to claim 1, wherein in case that the current client sends a page turning instruction to the electronic whiteboard server, the drawing data on the third layer where the current page is located is cleared, and the drawing data of the electronic whiteboard of a next page is received from the electronic whiteboard server and then drawn to the third layer where the current page is located, so as to achieve page turning.

8. The online electronic whiteboard content synchronization and sharing system according to claim 1, wherein in case that the current client sends a page deletion instruction to the electronic whiteboard server, after the electronic whiteboard server receives the page deletion instruction, the drawing data on a specified page is deleted and a deletion instruction of the specified page is forwarded to the other clients;

after the current client receives a response signal fed back from the electronic whiteboard server, a total number of pages of the electronic whiteboard is updated by −1, the drawing data on the third layer on the specified page is cleared, and the drawing data of the current page received from the electronic whiteboard server is drawn on the third layer of the specified page.

9. The online electronic whiteboard content synchronization and sharing system according to claim 1, wherein the online electronic whiteboard content synchronization and sharing system is applied to a video conference system; a video conference client added to the video conference system firstly sends a request to the electronic whiteboard server to obtain electronic whiteboard information shown by a current video conference; the electronic whiteboard information comprises the total number of pages of the electronic whiteboard, a background color and a background picture of each page of the electronic whiteboard, and the drawing data of an electronic whiteboard page shown currently; and then, the video conference terminal redraws and displays the drawing data of the electronic whiteboard page shown currently on the third layer of the electronic whiteboard of the video conference terminal according to the obtained electronic whiteboard information.

10. The online electronic whiteboard content synchronization and sharing system according to claim 3, wherein the first drawing data and the second drawing data are both dot matrix operation data.

\* \* \* \* \*